Jan. 8, 1924.

R. MANCHA

BATTERY BOX FOR STORAGE BATTERY LOCOMOTIVES

Filed Oct. 11, 1922

1,480,089

INVENTOR
Raymond Mancha.
BY Bakewell Church
ATTORNEYS

Patented Jan. 8, 1924.

1,480,089

UNITED STATES PATENT OFFICE.

RAYMOND MANCHA, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE.

BATTERY BOX FOR STORAGE-BATTERY LOCOMOTIVES.

Application filed October 11, 1922. Serial No. 593,931.

*To all whom it may concern:*

Be it known that I, RAYMOND MANCHA, a citizen of the United States, residing at St. Louis, Missouri, have invented a certain new and useful Improvement in Battery Boxes for Storage-Battery Locomotives, of which the following is a full, clear, and exact description, such as will enable others skilled in the art to which it appertains to make and use the same.

This invention relates to battery boxes for electric storage battery locomotives, and has for its main object to provide a battery box that is equipped with movable lids which are permanently combined with the box in such a manner that it is impossible to arrange said lids in such a position that they bear upon or come in contact with a "live" part of the battery, and thus produce a short circuit.

Another object is to provide a battery box that is equipped with movable lids which are permanently combined with the box and so arranged that when they are in their open position they do not interfere with the inspection or removal of the batteries.

And still another object is to provide a closure for a battery box that is inexpensive to manufacture, easy to open and close and of such construction that it effectively prevents water, dirt and other foreign matter from entering the box or coming in contact with the batteries in the box.

Figure 1:
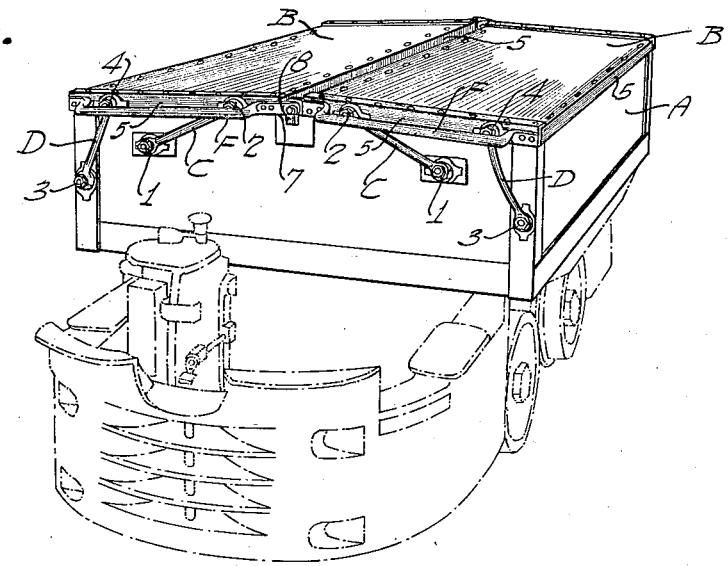
Figure 2:
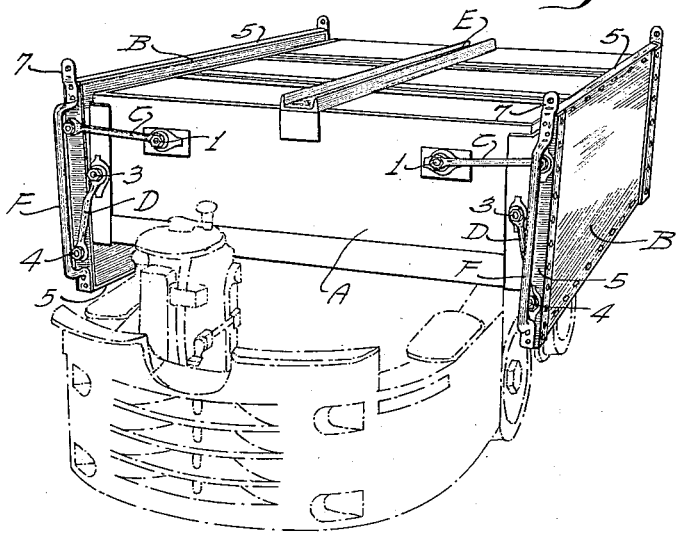

Figure 1 is a perspective view, illustrating a battery box constructed in accordance with my invention mounted on a storage battery mine locomotive, showing the lids of the box closed; and Figure 2 is a similar view, showing the lids of the box open.

Referring to the drawings which illustrate the preferred form of my invention, A designates a battery box of any preferred construction and B designates two lids that form a closure for the upper end of said box. Each of said lids is permanently connected to said box by a pair of links C and by a pair of links D, the links C being pivotally connected at 1 to the end walls of the box and at 2 to the ends of the lid adjacent the inner edge of the lid, and the links D being pivotally connected at 3 to the end walls of the box and at 4 to the ends of the lid adjacent the outer edges of the lid. The pairs of links C and D are so proportioned and combined with the box and with the lids that they will guide the lids outwardly and downwardly into substantially parallel relation with the side walls of the box, as shown in Figure 2, when the lids are raised or moved upwardly from the position shown in Figure 1 and will guide said lids inwardly and downwardly into their normal horizontal position at the upper end of the box when they are moved upwardly from the position shown in Figure 2. Consequently, it is impossible for the lids B to become disarranged or arranged in such a position that they will come in contact with "live" parts of the batteries, and moreover, when said lids are in their open position, as shown in Figure 2, they are out of the way and do not interfere with the inspection or removal of the batteries.

The particular shape and construction of the links C and D are immaterial, and said links can be pivotally connected in various ways to the lids B and to the box A, so long as they are so proportioned and arranged that they will cause the lids to follow such paths that they will clear the upper edges of the side walls of the box when said lids are moved into and out of their closed position, it being preferable, however, to design the links C and D so that they will normally hold the lids in a substantially horizontal position at the upper edge of the box when said lids are closed and will maintain said lids in an upright position substantially parallel to the side walls of the box when said lids are open. Each of the lids B is provided with a depending flange 5 that extends completely around the edge of the lid and which telescopes downwardly over the upper edge of the portion of the box which the lid closes when the lid is arranged in its closed position, as shown in Figure 1. In order to prevent water, dirt or other foreign matter from entering the box through the joint between the inner edges of the lids B, a gutter member E is arranged longitudinally of the box at the center of same, so as to receive the depending flanges 5 on the inner edges of the lids, said gutter member being formed preferably from a piece of channel iron supported by the end walls of the box and arranged with its side flanges projecting upwardly, as shown in Figure 2. Any water, dirt or the like that penetrates through the joint between the inner edges of the lids is caught by the channel E and prevented from entering the box and coming in contact with the batteries. Each of the lids B is preferably provided at its ends with handles F so as to facilitate the movement of the lids into and out of their closed position, and if desired, the lids may be provided with co-operating perforated ears 7 that are adapted to receive the hasp of a padlock 8 so as to enable the lids to be locked in their closed position.

Having thus described my invention, what I claim as new and desire to secure by Letters Patent is:

1. A battery box provided with a pair of lids that are adapted to be arranged over the upper end of the box, and pairs of swinging links pivotally connected to each lid and to the box for guiding, said lids in such a way that they will clear the upper edges of the side walls of the box when said lids are moved into their open position and for thereafter rigidly holding said lids in an upright position.

2. A battery box provided with a pair of lids that are adapted to be arranged over the upper end of the box, pairs of swinging links on the end walls of the box pivotally connected at their upper ends to the ends of said lids adjacent the inner edges of same, and additional pairs of swinging links on the end walls of the box pivotally connected at their upper ends to the ends of said lids adjacent the outer edges of same.

3. A battery box provided with a pair of movable lids, and a pair of swinging links pivotally connected to each end of each lid and to the box for guiding said lids upwardly and downwardly into substantially parallel relation with the side walls of the box when said lids are moved into their open position and for rigidly holding said lids in an upright position.

4. A battery box provided with a pair of movable lids, and swinging links connected to said lids and to the end walls of the box and so proportioned and arranged that they will maintain the lids in a substantially horizontal position at the upper edge of the box when said lids are closed and will rigidly hold said lids in a substantially upright position adjacent the side walls of the box when said lids are open.

5. A battery box provided with a pair of lids, pairs of swinging links on the outside of the box pivotally connected to said lids and arranged so as to rigidly hold said lids in an upright position at the sides of the box when said lids are open, and means for preventing water, dirt or other foreign matter from entering the box through the joint between the inner edges of the lids when the lids are closed.

6. A battery box provided with flanged lids that are adapted to telescope over the upper edge portion of the box, a member at the center of the box for collecting water, dirt and the like that passes through the joint between the meeting edges of said lids, and guide links that pivotally connect said lids to the end walls of the box.

7. A battery box provided with a pair of flanged lids, a substantially channel-shaped member aranged longitudinally of the box at the center of same for collecting water, dirt and the like that passes through the joint between the inner edges of said lids, links pivotally connected to the ends of said lids and to the end walls of the box for guiding the lids into and out of their closed position and maintaining them in a substantially upright position parallel to the side walls of the box when the lids are open, and handles on said lids.

RAYMOND MANCHA.